May 30, 1939.  B. C. ROEHRL  2,160,710
FILM SPOOL AND HOLDER
Filed Dec. 10, 1936   2 Sheets-Sheet 1.
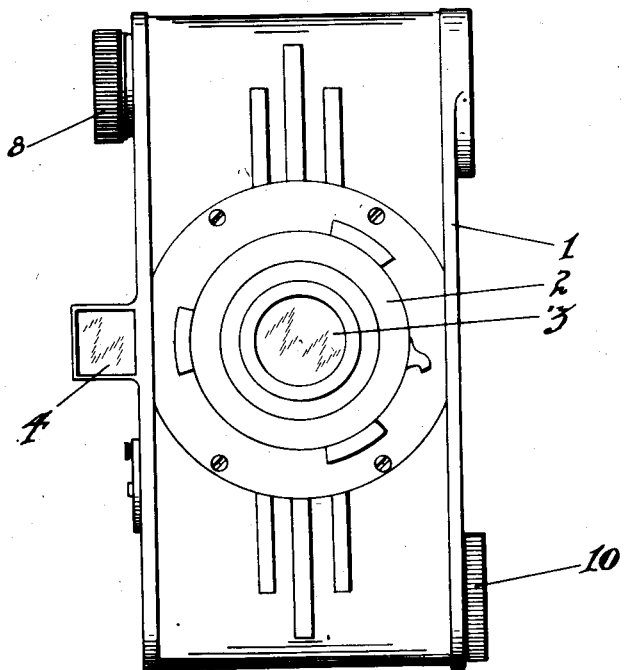
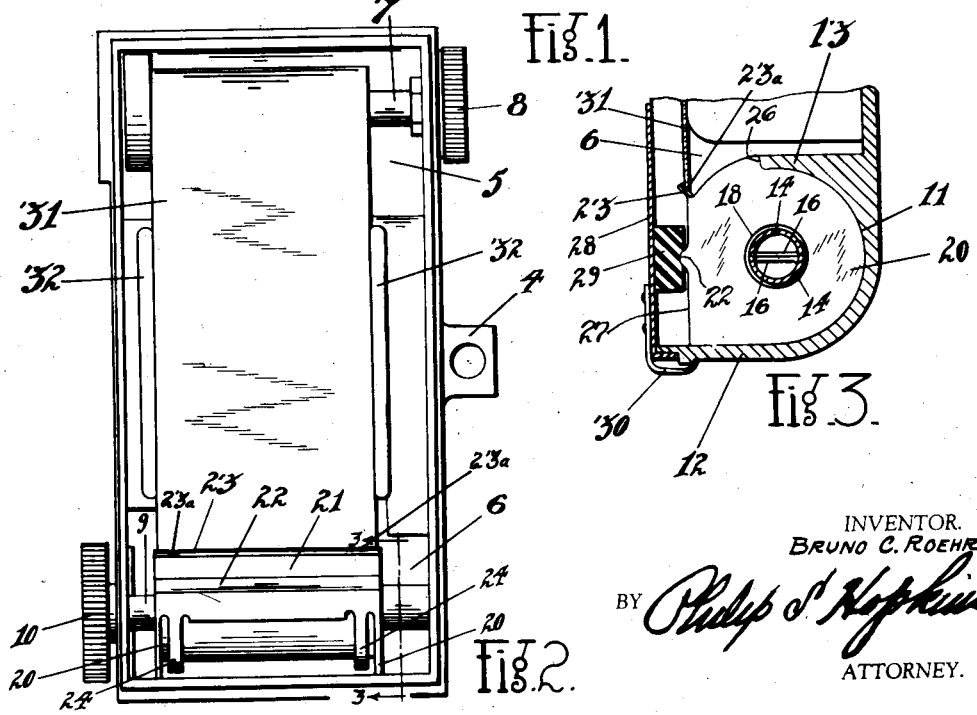
INVENTOR.
BRUNO C. ROEHRL.
BY Philip S. Hopkins
ATTORNEY.

May 30, 1939.  B. C. ROEHRL  2,160,710
FILM SPOOL AND HOLDER
Filed Dec. 10, 1936   2 Sheets-Sheet 2
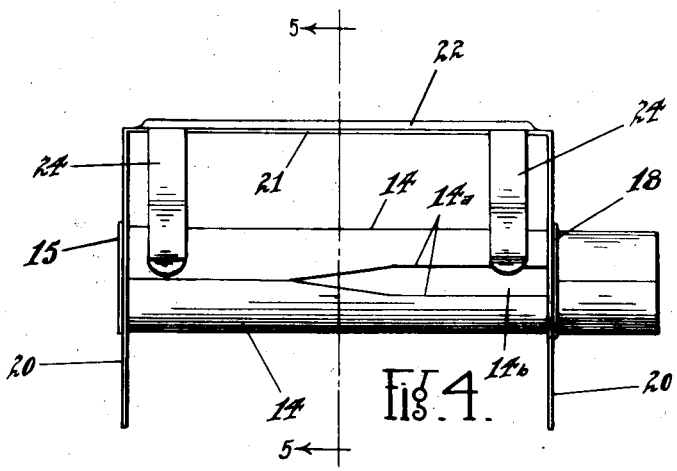
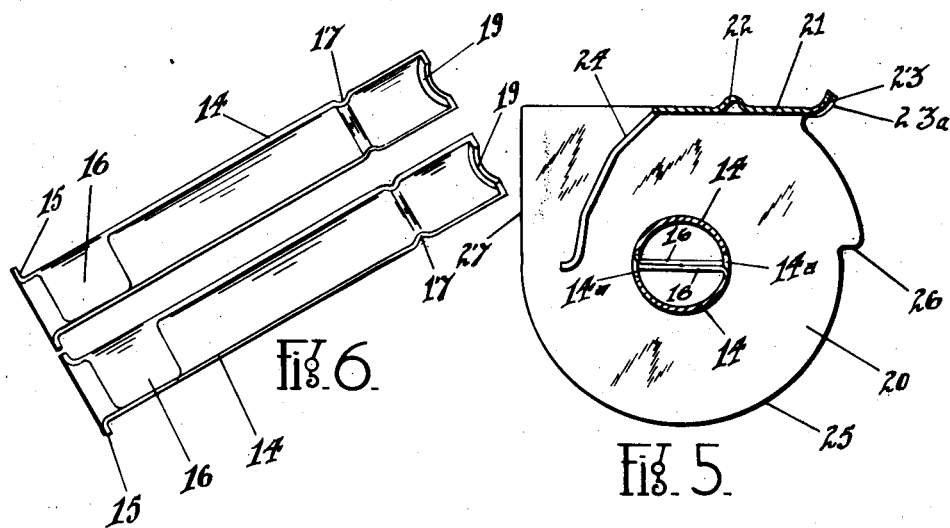
INVENTOR.
BRUNO C. ROEHRL.
BY *Philip S. Hopkins*
ATTORNEY.

Patented May 30, 1939

2,160,710

UNITED STATES PATENT OFFICE 2,160,710

FILM SPOOL AND HOLDER

Bruno C. Roehrl, Binghamton, N. Y., assignor, by mesne assignments, to Agfa Ansco Corporation, Binghamton, N. Y., a corporation of Delaware Application December 10, 1936, Serial No. 115,084

4 Claims. (Cl. 95—31)

My invention relates to a film spool and holder.

A popular type of photographic camera at the present time is the so-called "miniature" or "candid" camera which takes a roll of film of relatively narrow width and upon which may be exposed a relatively large number of small images, selected ones of which are later enlarged for the final prints. This type of camera generally distinguishes over the ordinary type of camera in one particular respect, namely the film is wound from the supply spool or cartridge on to a take-up spool until the entire roll has been exposed and then instead of leaving this exposed film on the takeup spool for removing the same from the camera for development and processing, the film is rewound from the take-up spool back on the supply spool or cartridge, such supply spool or cartridge thus constituting the original package for the film and the means by which it is taken from the camera for processing.

The primary object of my invention is to provide a film spool and support from which the film may be wound across the exposure area of a camera and upon which it may be rewound after completed exposure and removed from the camera for processing.

An important object of my invention lies in the provision of a film spool provided with a hub rotatably mounted in and supported by flanges for guiding the edges of the film and which flanges serve as a stationary support and bearing for the hub within the camera.

Another object of my invention lies in the provision of a novel two piece spool hub and key engaging means therefor.

Still another object lies in the provision of a flanged supporting holder for the spool hub which is of one piece construction and with a film guiding bridge connecting the flanges.

Still another object lies in the provision of cooperating means on the spool support whereby the same is engaged by and held in rigid position in the camera by the camera back.

Other objects and advantages will be apparent as the description proceeds, reference now being had to the figures of the accompanying drawings forming a part of this application and in which like reference numerals indicate like parts.

In the drawings Figure 1 is a front view of a camera such as my invention is particularly applicable for.

Figure 2 is a rear view of the camera with the back removed.

Figure 3 is a detail sectional view taken on the line 3—3 of Figure 2 and with the addition of the camera back in its relation to the film spool and holder.

Figure 4 is a side view of my improved film spool and holder.

Figure 5 is a sectional view taken on the line 5—5 of Figure 4.

Figure 6 is a detail view showing the two parts of the spool hub in separated relation.

Reference character 1 refers generally to a photographic camera of the type previously described, namely, of the "miniature" type and in which the film is adapted to be wound from the supply to the take-up spool and then rewound to the supply spool for removing the film from the camera. The camera is provided with the usual shutter 2, lens 3 and view finder 4. The body of the camera is provided at one end with the take-up film chamber 5 and at its opposite end with the supply film chamber 6. In the take-up chamber 5 there is mounted a spool or winding hub 7 journaled at each end in the side walls of the camera for rotation therein and having one end projecting through a side wall and provided with a finger piece or turning member 8.

In one wall of the camera adjacent one end of the supply chamber 6 there is slidably and rotatably mounted a winding key stem 9 extending through the wall and provided on its outer end with a finger piece 10. The inner end of the stem 9 may be suitably slotted for a purpose to be described. The stem 9 and winding member 10 are freely rotatable and are slidable inwardly and outwardly with respect to the camera to bring the end of the stem into or out of engagement with the supply spool. Any suitable friction means may be provided for retaining the stem in its adjusted position.

The supply chamber 6 of the camera is substantially semi-circular at the bottom as at 11 (see Figure 3). The end wall 12 of the camera constitutes the rear side of the chamber and an upwardly extending partition 13 spaced from and parallel with the end wall 12 constitutes the front side of the chamber.

Adapted to be disposed within this supply chamber is my improved film spool and holder comprising a spool hub consisting of two identical sections 14 in the form of elongated semi-circular channel members which, when placed together as shown clearly in Figures 4 and 5, provide a circular hub upon which film may be wound. These hub sections 14 are preferably of stamped and formed metal and at one end each is provided with an out-turned flange 15 and adjacent thereto an inwardly turned lip or web 16 extending from one edge of the section across the channel shaft portion thereof to the opposite edge.

When the sections 14 are placed together to form the complete hub, these webs 16 lie face to face against each other as shown clearly in Figure 5 and provide adjacent this end of the hub an engaging means for the conventional notched inner end (not shown) of the winding stem 9 when the same is pushed inwardly, as shown in Figure 2, whereby the hub may be rotated by such stem.

At a point spaced inwardly from the opposite end of the sections 14, the same are formed with depressions or grooves 17 which when the sections are placed together to form the hub, are in alignment and provide a continuous groove around the periphery of the hub. This groove is for the purpose of receiving a spring ring or retaining means 18 which serves to hold the sections together in their hub forming relation. A portion of the hub sections projecting beyond the groove 17 have their ends turned inwardly as at 19 and this projecting end constitutes a positioning device for the spool and holder within the camera and also serves as a convenient means for turning the hub for winding or unwinding the film when the spool and holder are out of the camera. The sections 14 of the hub are cut away at their free edges as at 14a to provide openings or slots 14b through which the end of the film or protecting paper backing or leader strip may be inserted for securing such end to the hub for winding thereon.

The sections 14 are journaled in a holder comprising the flanges 20 which are bent downwardly from and at right angles to a cross piece or bridge 21. This bridge is provided substantially centrally thereof, and extending longitudinally across the same, with a bead or embossed portion 22 for reenforcing the same. One edge of the bridge 21 is turned upwardly a trifle as at 23 to form a lip for guiding the film to and from the spool hub. This lip 23 is provided adjacent its ends, and in alignment with the edges of the film, with embossed portions 23a with which the edges of the film engage as it is wound to and from the spool hub, thus holding the body or picture area of the film away from the lip to avoid scratching such area.

The opposite edge of the bridge 21 is provided adjacent each end with rearwardly and downwardly extending spring fingers 24 adapted to lightly and frictionally engage a roll of film on the hub to prevent uncurling or inadvertent unwinding thereof.

The flanges 20 are circular in shape adjacent their lower edges as at 25 to conform to the semicircular configuration of the bottom of the supply chamber 6. On the front edge of each flange 20 there is provided a shoulder 26 adapted to engage and overlie the partition 13 in the camera body. The rear edge of each of the flanges 20 above the circular portion 25 is formed straight as at 27 to engage and conform to the straight rear wall 12 of the supply chamber. One of the flanges 20 engages against the inner side of the flanges 15 of the sections 14 and the other flange 20 is adapted to lie just inside the groove 17 and retaining ring 18. The flanges 20 obviously serve as additional means for holding the half sections of the hub together to maintain the circular shape of the hub. The hub is thus rotatably supported in the holder and the sections thereof held against separation.

The entire holder and spool hub are preferably stamped and formed from light sheet metal and constitute but three pieces in their entirety.

As shown in Figure 3, the camera back 28 is provided on its inside with a strip 29 of sponge rubber or like soft friction material so located that when the back is secured upon the camera by means of the fastening means 30, the strip 29 engages over and against the bridge 21 and particularly engages the bead 22 thereof whereby to frictionally retain the spool holder in its operative position within the supply chamber 6.

The film 31 is of course wound upon the sections 14 either alone or with a protective paper backing extending the full length of the film and beyond its ends as in an ordinary rollfilm cartridge, or with an opaque leader strip suitably secured to the free ends of the film. The film is led from the sections 14 forwardly beneath the guide lip 23 on the bridge 21 and over the exposure area of the camera between side guides 32 suitably formed in the body of the camera on either side of such exposure area. The end of the film or paper is then secured in a suitable manner to the take-up spool 7 upon which it is to be wound.

The freely rotatable sections 14 of the supply spool permits the ready winding of the film from the same on to the take-up spool 7.

After the entire length of the film has been exposed, the same is then rewound by means of the winding member 10 and stem 9 engaging the webs 16 of the sections 14, until the same has been completely returned to the sections 14. The lip 23 again serves as a guide for the film during the rewinding operation and its upturned character prevents scratching the film as it passes the same.

The flanges 20 of course serve as guides for the edges of the film and act in the same manner as the fixed flanges on the hub of an ordinary spool. In addition these flanges of course serve as the frame or supporting means for the spool.

During such winding and rewinding operations the spool and frame in the supply chamber are held against lateral or twisting movement by means of the shoulder 26 engaging the upper end of the partition 13, the straight edges of the flanges 20 engaging the straight rear side of the supply chamber and the engagement of the cushion strip 29 against the bridge 21 of the frame.

After the film has been entirely rewound, the camera back can be removed, the winding stem 9 pulled outwardly and the hub and frame readily lifted from the camera.

Of course changes may be made in details of construction and arrangement of parts. I do not limit myself, therefore, to the exact form herein shown and described other than by the appended claims.

I claim:

1. A film holder comprising spaced film guide flanges, a hub rotatably journalled therein, a bridge connecting said flanges at one side, spring fingers extending from one edge of said bridge for engaging a roll of film on said hub, an upturned lip on the opposite edge of said bridge, and a longitudinally extending rib across said bridge, said flanges, bridge, fingers, lip and rib all constituting a single formed piece of material.

2. In combination, a camera and film holder, said camera having a chamber for receiving said holder, a partition in said camera forming one wall of said chamber, said holder comprising film guide flanges and a hub rotatably journalled therein, a bridge connecting said flanges at one side, said flanges having shouldered portions engaging the upper edge of said partition.

3. In combination, a camera and film holder, said camera having a chamber for receiving said holder, a partition in said camera forming one wall of said chamber, said holder comprising film guide flanges and a hub rotatably journalled therein, a bridge connecting said flanges at one side, said flanges having shouldered portions engaging the upper edge of said partition, and said flanges substantially conforming to the shape of said chamber.

4. In combination, a camera and film holder, said camera having a chamber for receiving said holder, a partition in said camera forming one wall of said chamber, said holder comprising film guide flanges and a hub rotatably journalled therein, a bridge connecting said flanges at one side, said flanges having shouldered portions engaging the upper edge of said partition and said flanges substantially conforming to the shape of said chamber, a cover for said camera and chamber, and resilient means on said cover for engaging said bridge to secure said holder against movement.

BRUNO C. ROEHRL.